United States Patent
Ramesh et al.

(10) Patent No.: US 6,462,101 B1
(45) Date of Patent: Oct. 8, 2002

(54) FOAM COMPRISING A BLEND OF LOW DENSITY POLYETHYLENE AND HIGH MELT TENSION POLYPROPYLENE

(75) Inventors: N. S. Ramesh, Grapevine, TX (US); Jim Baker, Scotia, NY (US)

(73) Assignee: Sealed Air Corporation (US), Saddlebrook, NJ (US)

( * ) Notice: Subject to any disclaimer, the term of this patent is extended or adjusted under 35 U.S.C. 154(b) by 0 days.

(21) Appl. No.: 09/949,734

(22) Filed: Sep. 10, 2001

(51) Int. Cl.⁷ .................................................. C08J 9/00
(52) U.S. Cl. ........................... 521/81; 521/79; 521/134; 521/142

(58) Field of Search .............................. 521/79, 81, 134, 521/142

(56) References Cited

U.S. PATENT DOCUMENTS 5,468,781 A * 11/1995 Sugarno et al.
5,773,481 A * 6/1998 Fischer et al.

* cited by examiner

*Primary Examiner*—Morton Foelak
(74) *Attorney, Agent, or Firm*—Thomas C. Lagaly

(57) ABSTRACT

A foam includes a blend of low density polyethylene and polypropylene having a melt tension of greater than about 20 centinewtons at 200° C.

10 Claims, 1 Drawing Sheet

FOAM COMPRISING A BLEND OF LOW DENSITY POLYETHYLENE AND HIGH MELT TENSION POLYPROPYLENE

BACKGROUND OF THE INVENTION

The present invention relates generally to polyolefin foams and, more particularly, to extruded foam sheets comprising a blend of polypropylene and low density polyethylene.

Polyolefin foams, particularly polyethylene foams, and methods for manufacturing such foams are well known in the art. See, e.g., U.S. Pat. Nos. 5,348,984 (Lee), 5,462,974 (Lee), and 5,667,728 (Lee), the disclosures of which are incorporated herein by reference thereto. One of the most common polyethylenes used is low density polyethylene (LDPE).

While polyethylene (PE) possesses a number of beneficial physical and chemical properties when used to produce a foamed sheet, a disadvantage of PE is that extruded foam sheets made therefrom have a flexural modulus that is lower than would otherwise be desired for certain applications. For example, PE foams are commonly used to manufacture a type of flotation article known as a "bodyboard," which is a generally planar foamed structure of various shapes and sizes that allows individuals to be carried forward by oceanic waves as the waves break near the shore, i.e., to ride or "surf" the waves. Individuals engaging in such activity generally prefer that the bodyboard be as stiff as possible as this allows the individual to maneuver the board to control somewhat the individual's direction of travel relative to the wave surface upon which the individual is "surfing." Too much flexure in the bodyboard detracts from this ability to maneuver the board along the wave surface. Accordingly, it would be desirable to increase the stiffness of the foam used to make bodyboards.

Another shortcoming of foam made from PE is that such foam has a lower temperature resistance than would otherwise be desired in certain applications, e.g., when using PE foam as an insulation material or as a container for microwavable foods. When exposed to relatively high temperatures as experienced in such applications, PE foam tends to soften and its shape becomes distorted.

One possible solution is to produce foam from polypropylene (PP). PP foams are typically stiffer and have greater temperature resistance than PE foam. However, molten PP generally has poor melt strength, making it difficult to produce acceptable quality foam, i.e., one having a uniform array of fully-formed, closed cells. Further, PP foams are often brittle and allow cracks to propagate readily through the foam. In addition, PP foams generally exhibit poor thermoformability such that it is difficult to thermoform such foams into desired shapes.

Accordingly, a need exists in the art for an improved foam that overcomes the foregoing disadvantages.

SUMMARY OF THE INVENTION

That need is met by the present invention, which, in one aspect, provides a foam, comprising a blend of low density polyethylene and polypropylene having a melt tension of greater than about 20 centinewtons at 200° C. The low density polyethylene is present in the blend at a weight percentage ranging from about 1 to about 30.

Another aspect of the invention pertains to a method of making a foam, comprising:

a. forming a molten blend of low density polyethylene and polypropylene, the polypropylene having a melt tension of greater than about 20 centinewtons at 200° C. and the low density polyethylene being present in the blend at a weight percentage ranging from about 1 to about 30;

b. adding a blowing agent to the blend; and c. causing the blowing agent to expand within the blend, thereby forming a foam.

The inventors have discovered that a blend of low density polyethylene and polypropylene having a melt tension of greater than about 20 centinewtons produces an excellent quality foam. Surprisingly, such a blend was found to exhibit extensional thickening, i.e., an increase a in extensional viscosity, when subjected to temperature and strain rate conditions encountered when polyolefins expand into a foam. As a result, the foams possess superior physical properties in comparison to foams made from PE or PP alone. In particular, the blend foams in accordance with the present invention have greater stiffness and higher temperature resistance than PE foam alone, while also being higher in quality, less brittle, and more thermoformable than foams made from PP alone.

DETAILED DESCRIPTION OF THE INVENTION

Figure 1:
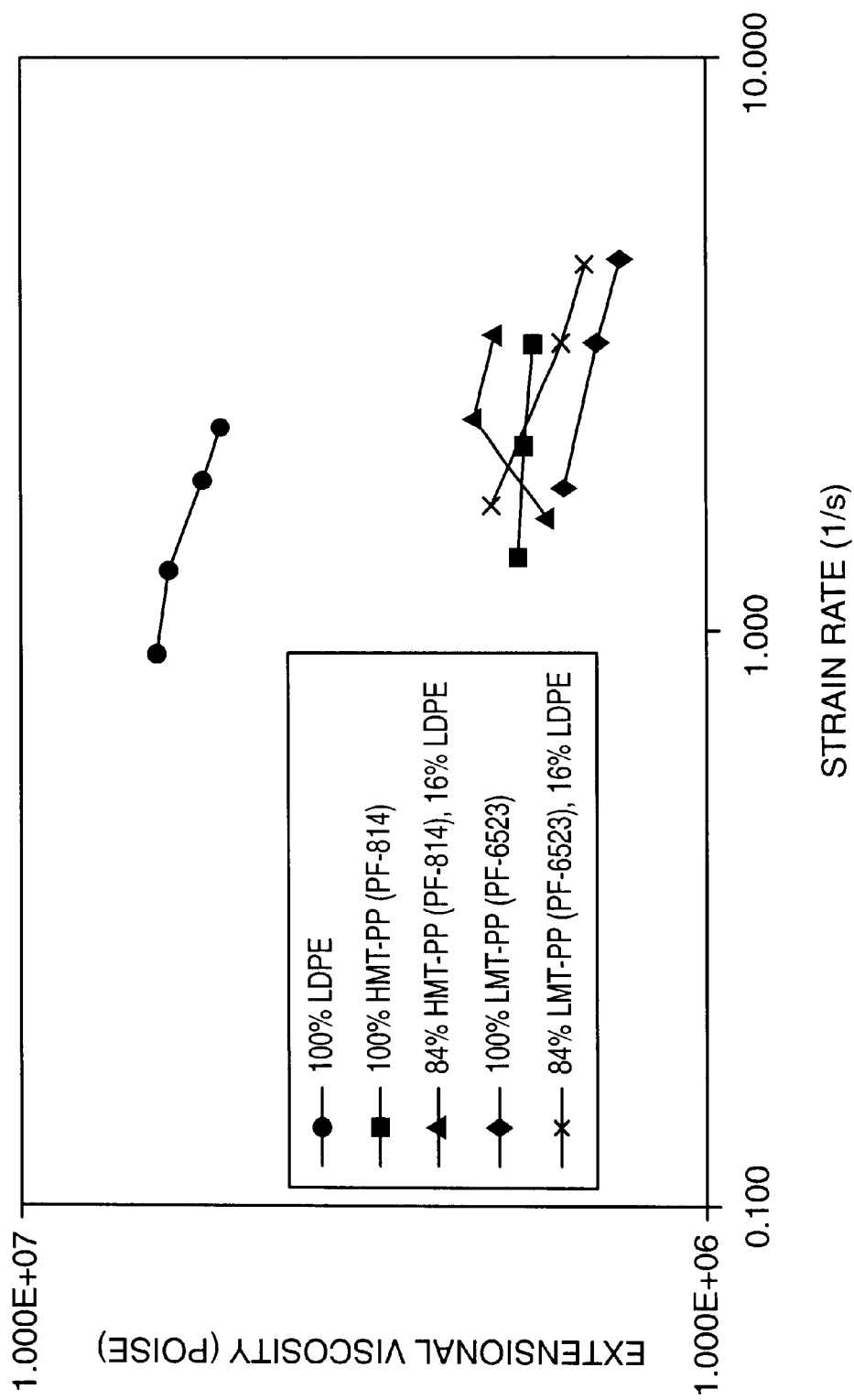
FIG. 1 is a graph showing extensional viscosity vs. strain rate for a number of polymers and polymer blends as described in Example 4.

Suitable LDPEs in accordance with the present invention have a melt flow index ranging from about 1 to about 40 and a density ranging from about 0.912 to about 0.930 g/cc.

Suitable polypropylenes include atactic, isotactic, syndiotactic, and long-chain branched PP homopolymers and copolymers having a melt tension of greater than about 20 centinewtons at 200° C. ("high melt tension PP" or "HMT-PP"). Such HMT-PPs preferably have a melt flow index ranging from about 1 to 20 and a density ranging from about 0.88 to 0.910 g/cc.

In accordance with the present invention, "melt tension" may be determined by stretching a strand of polymer between two counter-rotating wheels and maintaining the temperature of the polymer at 200° C. The frequency of rotation increases linearly and the resultant pulling force increases as the filament is stretched. The force is recorded in centinewtons (cN) until the polymer strand breaks. The maximum force obtained before break is recorded as the melt tension of the polymer. The foregoing procedure may be performed as described by M. B. Bradley and E. M. Phillips in the Society of Plastics Engineers's ANTEC 1990 Conference paper at page 718, the disclosure of which is hereby incorporated herein by reference. A suitable device for performing the test is a Rheotens Melt Tension apparatus commercially available from Goettfert, Rock Hill, S.C.

The quality of foams produced from HMT-PP alone have been found to be less than desired for commercial applications (see, e.g., Examples 1 and 3 below). In accordance with the present invention, the inventors have discovered that the quality of HMT-PP foam can be improved by blending low density polyethylene with HTF-PP. Surprisingly, such blend was found to exhibit a beneficial increase in extensional viscosity during the process of cellular formation and expansion as the blend was made into a foam. This was determined by measuring the extensional viscosity of the molten blend vs. strain rate at the strain rate range in which cellular expansion occurs during the formation of polyolefin foams, namely between 1 and 4 $s^{-1}$ (see Example 4). Such increase in viscosity during the foaming process indicates strain hardening, i.e., increased melt strength due to molecular chain entanglement, as the polymer blend is stretched during cell formation. As is well understood by those of ordinary skin in the art of foam production, strain hardening behavior by a polymer melt during foaming beneficially facilitates the production of well-developed, uniform cells without open cell formation and/or cell rupture as the polymer is stretched by the expanding cells.

In contrast, 100% HMT-PP was found to exhibit extensional thinning behavior, i.e., a decrease in extensional viscosity, when subjected to an increasing strain rate ranging from 1–4 $s^{-1}$. Such decrease in viscosity during foaming leads to cell rupture and collapse, thereby resulting in poor quality foam. This was in fact observed in making comparative foams from 100% HMT-PP (see Example 1). On the other hand, foams made from a blend of HMT-PP and LDPE in accordance with the present invention were of high quality and were able to be made at lower densities than foams made from 100% HMT-PP (Example 1). This is believed to have occurred as a result of the extensional thickening behavior of such blend during foaming, i.e., at an increasing strain rate ranging from 1–4 $s^{-1}$.

Low density polyethylene is preferably present in the blend with HMT-PP at a weight percentage ranging from about 1 to about 30, based on the total weight of LDPE and HMT-PP in the blend. More preferably, the weight percentage of LDPE in the blend ranges from about 5 to about 25, such as from about 10 to about 20.

Preferably, the foam has a density ranging from about 0.5 to about 15 pounds/ft$^3$. More preferably, the density ranges from about 1.5 to about 10 pounds/ft$^3$. The foam may be in the form of a sheet or plank having a thickness ranging from about 0.025 to about 4 inches and, more preferably, from about 0.06 to about 3 inches.

In producing the foam sheets described herein, any conventional chemical or physical blowing agents may be used. Preferably, the blowing agent is a physical blowing agent such as carbon dioxide, ethane, propane, n-butane, isobutane, pentane, hexane, butadiene, acetone, methylene chloride, any of the chlorofluorocarbons, hydrochlorofluorocarbons, or hydrofluorocarbons, as well as mixtures of the foregoing.

The blowing agent may be mixed with the polymer resin (i.e., the blend of LDPE and HMT-PP) in any desired amount to achieve a desired degree of expansion in the resultant foam. Generally, the blowing agent may be added to the polymer resin in an amount ranging from about 0.5 to 80 parts by weight, based on 100 parts by weight of the polymer. More preferably, the blowing agent is present at an amount ranging from 1 to 30 and, most preferably, from 3 to 15 parts per 100 parts by weight of the polymer.

If desired or necessary, various additives may also be included with the polymer. For example, it may be desirable to include a nucleating agent (e.g., zinc oxide, zirconium oxide, silica, talc, etc.) and/or an aging modifier (e.g., a fatty acid ester, a fatty acid amide, a hydroxyl amide, etc.). Other additives that may be included if desired are pigments, colorants, fillers, antioxidants, flame retardants, stabilizers, fragrances, odor masking agents, and the like.

Foam in accordance with the present invention is preferably made by an extrusion process that is well known in the art. In such a process, the LDPE and HMT-PP polymers are added to an extruder, preferably in the form of resin pellets. Any conventional type of extruder may be used, e.g., single screw, double screw, and/or tandem extruders. In the extruder, the resin pellets are melted and mixed. A blowing agent is preferably added to the melted polymer via one or more injection ports in the extruder. Any additives that are used may be added to the melted polymer in the extruder and/or may be added with the resin pellets. The extruder pushes the entire melt mixture (melted polymer, blowing agent, and any additives) through a die at the end of the extruder and into a region of reduced temperature and pressure (relative to the temperature and pressure within the extruder). Typically, the region of reduced temperature and pressure is the ambient atmosphere. The sudden reduction in pressure causes the blowing agent to nucleate and expand into a plurality of cells that solidify upon cooling of the polymer mass (due to the reduction in temperature), thereby trapping the blowing agent within the cells.

The foregoing, as well as other, aspects and advantages of the invention may be further understood by reference to the following examples, which are provided for illustrative purposes only and are not intended in any way to be limiting.

EXAMPLES

Example 1

Extruded foam planks having a thickness of about 2.4 inches and a width of 25 inches and comprising a blend of high melt tension PP ("HMT PP") and LDPE were prepared on a twin screw extruder having a flat die. A comparative foam comprising 100% HMT-PP was also made. The following materials and run conditions were employed:

HMT-PP—PF-814, a polypropylene homopolymer from Basell Polyolefms having a melt tension of 25 cN @ 200° C., melt index of 3 g/ 10 min. @ 230° C. and 2.16 Kg), and a density of 0.9 g/cc.
LDPE—ExxonMobil LLA003 LDPE having a density of 0.919 g/cc and a melt index of 2.1.
Blowing agent—Isobutane
Nucleating agent—CF-20, an endothermic nucleating agent comprising sodium carbonate and citric acid (supplied by Clariant Additives)
Aging Modifier—Glycerol monosterate
Resin rate—1200 lbs./hr
Blowing agent rate—64.1 lbs/hr The results are summarized in Table 1.

TABLE 1

| Properties | 100% HMT-PP Plank Foam (Comparative) | 84 wt.% HMT-PP/16 wt. % LDPE Blend Plank Foam | Comments |
|---|---|---|---|
| Output rate, lbs/hr | 1200 | 1200 | |
| RPM | 22 | 22 | |
| Power, amps | 220 | 210 | Less power required for HMT-PP/LDPE blend foam. |
| Foam density, lbs/ft$^3$(pcf) | Lowest possible density was 3.86 with acceptable surface quality | 2.45 | 37% lighter density foam with LDPE addition. |
| Foam Quality | Pre-foaming occurred in die; poor melt strength; collapsed foam; contained non-cellular voids. | Good quality foam; good melt strength and good surface quality. | Improved foam quality as a result of blending LDPE with HMT-PP. |
| Brittleness | Very brittle | Elastic | Improvement in elasticity due to blending LDPE with HMT-PP. |

Example 2

Extruded foam planks having a thickness of about 2.4 inches and 25 inches width comprising a blend of high melt tension HMT-PP and LDPE were prepared on a twin screw extruder. A comparative foam comprising 100% LDPE was also made. The materials and run conditions were as set forth in Example 1 above, except that the resin rate for 100% LDPE was about 800 lbs./hr. The results are summarized in Table 2.

TABLE 2

| Foam Product | Compression Strength, psi @5% | Compression Strength, psi @10% | Compression Strength, psi @25% | Compression Strength, psi @50% |
|---|---|---|---|---|
| 100% LDPE foam, 2.42 pcf (Comparative) | 7.28 | 8.21 | 12.21 | 26.62 |
| 84 wt. % HMT-PP/16 wt. % LDPE foam, 2.45 pcf | 18.70 | 19.90 | 21.20 | 28.30 |
| % Improvement | 157% | 142% | 73.6% | 6.3% |

Compression strength testing was performed in accordance with ASTM D3575, suffix D. As indicated by the results shown in Table 2, the 'initial compression strength', i.e., between 5–50% compression, is superior for the HMT-PP/LDPE blend foam. This is desired for bodyboards and other end-use applications wherein foam stiffness is advantageous.

The LDPE and HMT-PP/LDPE foams were tested to determine their relative levels of stiffness. From each foam sheet, a sample having the dimensions 3" wide×2.4" thick× 12" long were obtained. The samples were placed horizontally atop a pair of support stands spaced from one another by a distance of 10 inches so that each sample spanned the 10 inch separation between the two stands. Force was then applied to the top of each sample at the mid-way point between the two support stands, i.e., 5 inches from each stand. For each sample, measurements were made of the amount of force (measured in pounds-force ($lb_f$)) required to bend the sample sufficiently to deflect the center of the sample 0.25" from the horizontal starting position of the sample's center. Similar measurements were made for 0.5", 0.75" and 1" bending deflections. The results are summarized in Table 3.

TABLE 3

| Foam Product | Foam Thickness inches | Bending Force, pound-force @0.25" deflection | Bending Force, pound-force @0.5" deflection | Bending Force, pound-force @0.75" deflection | Bending Force, pound-force @1.0" deflection |
|---|---|---|---|---|---|
| 100% LDPE foam, 2.40 pcf (Comp.) | 2.42" | 5.5 | 8.7 | 11.2 | 13.00 |
| 84 wt. % HMT-PP/16 wt. % LDPE foam, 2.45 pcf | 2.47" | 28,6 | 52.9 | 67.9 | 77.3 |
| Improvement | — | +420% | +508 | +506% | +495% |

As demonstrated, a dramatic increase in stiffness is achieved by blending HMT-PP and LDPE in accordance with the present invention in comparison to a foam made from LDPE alone.

Example 3

Extruded foam sheets having a thickness of 0.1 inch and comprising a blend of HMT-PP and LDPE were prepared on a twin screw extruder having an annular sheet die. A comparative foam comprising 100% HMT-PP was also made. The materials used were those described in Example 1 above, except that the LDPE was Nova 219 low density polyethylene having a density of 0.919 g/cc and a melt index of 2 (from Nova Chemical) and no aging modifier was used.

The run conditions and results are summarized in Tables 4 and 5.

TABLE 4

| Condition | 100% HMT-PP (Comparative) | Example #2 (85 wt. % HMT-PP/15 wt. % LDPE) |
|---|---|---|
| Motor Amps | 58.3 | 57.1 |
| Resin rate, lbs/hr | 150 | 150 |
| Butane, lbs./hr | 6.64 | 6.64 |
| Screws speed, rpm | 71 | 71 |

TABLE 5

| PROPERTY | 100% HMT-PP (Comparative) | 85 wt. % HMT-PP/15 wt. % LDPE |
|---|---|---|
| Foam Density, pcf | 3.33. | 2.92 |
| Tensile Strength, psi MD/TD ("machine direction/transverse direction") | 204.4/125.6 | 169.6/104.9 |
| Tear Resistance, lbf/inch MD/TD | 33.9/48.01 | 24.9/41.2 |
| % Elongation Mt)/TD | 5.98/7.34 | 25.3/16.3 |
| % increase in elongation over HMT-PP foam* | n/a | 323%/122% |

*((Elongation of blend foam-Elongation of HMT-PP foam)/Elongation of HMT-PP foam) × 100

Foams made from HMT-PP/LDPE blends in accordance with the present invention possess superior elongation, i.e., elasticity, relative to foams made from 100% HMT-PP. Such increased elasticity for foams in accordance with the invention is highly advantageous for thermoforming applications because it allows the foam to more readily be thermoformed into various shapes as desired, e.g., microwavable food trays.

The increased tensile and tear values for the 100% HMT-PP foam is believed to be due to its higher density. Nevertheless, such foams were found to be so stiff and brittle that they cracked easily. This was in contrast with blend foams in accordance with the present invention, which were found to possess both a high degree of stiffness and also sufficient resilience and elasticity to avoid cracking when subjected to a bending force. Although from the data in Table 5, tear resistance for HMT-PP foam appears to be higher, HMT-PP foam was found to tear more readily than HMT-PP/LDPE blend foams once a crack is initiated. This was believed to be due to the poor elasticity of the HAT-PP foam.

Example 4

Rheology testing was undertaken to evaluate the extensional rheology of a HMT-PP/LDPE blend in accordance with the invention in comparison with:

HMT-PP alone,
low melt tension PP ("LMT-PP") alone,
LDPE alone, and
a blend of LMT-PP and LDPE.

The LMT-PP was PF-6523, a polypropylene homopolymer having a melt tension of about 2.1 cN @ 200° C., a melt index of 4.7 g/ 10 min. (@ 230° C. and 2.16 Kg), and a density of 0.90 g/cc; commercially available from Basell Polyolefins. The LDPE was ExxonMobil LLA003 as described above. The HMT-PP was PF-814 from Basell Polyolefins as also described above.

A Haake Rheocord 90 twin-screw extruder fitted with a capillary rheometer was used to perform extensional rheology testing according to the Cogswell method as described in his book "Polymer Melt Rheology," Woodhead Publishing Limited, Cambridge (1994) on page 141. The experimental die set and procedure used to carry out the Cogswell test were as described in the Society of Plastics Engineers' 57$^{th}$ Annual Technical Conference paper, pages 1177–1182, by N. Malwitz and N. S. Ramesh in 1999. Both of the foregoing publications are hereby incorporated herein by reference. During the testing, the polypropylenes and polypropylene/LDPE blends were maintained at a temperature that was 14° C. greater than the melting temperature of the polypropylenes (156° C.) and the calculated melting temperature of the blends (148° C.). Thus, the polypropylenes were maintained at 170° C. and the blends were maintained at 162° C. Two capillary dies were used. Both dies were 45° half angle converging cones, 20 mm diameter at the inlet with a 3 mm outlet. One die had a zero-length (orifice) 3 mm capillary opening at the outlet; the other die had a pure shear region at the outlet with a length/diameter ratio of 16.7 (3 mm diameter and 50 mm length). These converging cone dies were used to measure the pressure drop of polymer in extension. Due to the converging angle, the polymer is accelerated and stretched. The resistance to stretching is a measure of extensional viscosity. The mathematical equations governing the extensional flow were derived by Cogswell and are set forth at page 141 in the above-referenced "Polymer Melt Rheology." Such equations were used to calculate the extensional viscosities and strain rates as set forth below in Tables 6–10 and as shown graphically in FIG. 1.

The results shown in FIG. 1 and Tables 6–10 demonstrate that, at strain rates between 1 and 4 $s^{-1}$, LDPE and HMT-PP individually exhibit extensional thinning behavior, i.e., the extensional viscosity of such polymers decreases with increasing strain rate. Surprisingly, the combination of the LDPE and HMT-PP resulted in extensional thickening behavior, i.e., an increase in extensional viscosity, within the important strain rate range of 1 to 4 $s^{-1}$ (i.e., the strain rate to which polymers are subjected during foaming). Specifically, the extensional viscosity of the LDPE/HMT-PP blend increased from $1.75 \times 10^6$ at a strain rate of 1.58 $s^{-1}$ to $2.22 \times 10^6$ at a strain rate of 2.35 $s^{-1}$, and then to $2.08 \times 10^6$ at a strain rate of 3.28 $s^{-1}$. Significantly, a peak increase in extensional viscosity occurred between strain rates of 1.58 and 2.35 $s^{-1}$. This is significant because, during expansion of polyolefin foams, the majority of the polymer is biaxially deformed within such strain rate range. Thus, the LDPE/HMT-PP blend in accordance with the present invention produces extensional thickening at those strain rates that are the most beneficial for producing high quality foam.

Extensional thickening of the LDPE/HMT-PP blend was unexpected since both components of such blend, on an individual basis, exhibited extensional thinning at strain rates between 1 and 4 $s^{-1}$. It is believed that the extensional thickening behavior of the LDPE/HMT-PP blend in accordance with the present invention is primarily responsible for the superior physical properties and foam quality as shown in Examples 1–3 above.

In contrast, the blend of LMT-PP and LDPE exhibited a decrease in extensional viscosity with increasing strain rate between 1 and 4 $s^{-1}$, i.e., extensional thinning, which indicates that such a blend would produce a poor cellular structure upon expansion.

TABLE 6

100% LOPE
(Comparative)

| Extensional Strain Rate (1/sec) | Extensional Viscosity (poise) |
|---|---|
| 0.91 | 6.51E+06 |
| 1.27 | 6.27E+06 |
| 1.82 | 5.55E+06 |
| 2.26 | 5.27E+06 |

TABLE 7

100% HMT-PP (PF-814)
(Comparative)

| Extenslonal Strain Rate (1/sec) | Extensional Viscosity (poise) |
|---|---|
| 1.36 | 1.90E+06 |
| 2.11 | 1.87E+06 |
| 3.16 | 1.81E+06 |

TABLE 8

84% HMT-PP (PF-814), 16% LDPE

| Extensional Strain Rate (1/sec) | Extensional Viscosity (poise) |
|---|---|
| 1.58 | 1.75E+06 |
| 2.35 | 2.22E+06 |
| 3.28 | 2.08E+06 |

TABLE 9

100% LMT-PP (PF-6523)
(Comparative)

| Extensional Strain Rate (1/sec) | Extensional Viscoslty (poise) |
|---|---|
| 1.79 | 1.63E+06 |
| 3.20 | 1.46E+06 |
| 4.49 | 1.36E+06 |

TABLE 10

84% LMT-PP (PF-6523), 16% LDPE
(Comparative)

| Extensional Strain Rate (1/sec) | Extensional Viscosity (poise) |
|---|---|
| 1.65 | 2.07E+06 |
| 3.19 | 1.64E+06 |
| 4.37 | 1.52E+06 |

While the invention has been described with reference to illustrative examples, those skilled in the art will understand that various modifications may be made to the invention as described without departing from the scope of the claims which follow.

What is claimed is:

1. A foam, comprising a blend of low density polyethylene and polypropylene having a melt tension of greater than about 20 centinewtons at 200° C., said low density polyethylene being present in said blend at a weight percentage ranging from about 1 to about 30.

2. The foam of claim 1, wherein said foam has a density ranging from about 0.5 to about 15 pounds/ft$^3$.

3. The foam of claim 1, wherein said foam comprises a plurality of cells containing therein at least one physical blowing agent.

4. The foam of claim 1, wherein said foam is in the form of a sheet or plank having a thickness ranging from about 0.025 to about 4 inches.

5. A method of making a foam, comprising:
   a. forming a molten blend of low density polyethylene and polypropylene, said polypropylene having a melt tension of greater than about 20 centinewtons at 200° C., said low density polyethylene being present in said blend at a weight percentage ranging from about 1 to about 30;
   b. adding a blowing agent to said blend; and
   c. causing said blowing agent to expand within said blend, thereby forming a foam.

6. The method of claim 5, wherein said step of causing said blowing agent to expand is accomplished by extruding said blend and blowing agent through a die and into a region of reduced pressure.

7. The method of claim 6, wherein said foam is extruded as a foam sheet or plank having a thickness ranging from about 0.25 to about 4 inches.

8. The method of claim 5, wherein said foam has a density ranging from about 0.5 to about 15 pounds/ft$^3$.

9. The method of claim 5, wherein said blowing agent comprises at least one physical blowing agent.

10. The method of claim 5, wherein said blend exhibits at least some increase in extensional viscosity with increasing strain rate between 1 and 4 s$^{-1}$.

* * * * *